No. 688,386. Patented Dec. 10, 1901.
T. CARNEY.
BRAKE MECHANISM.
(Application filed Mar. 31, 1900.)
(No Model.)
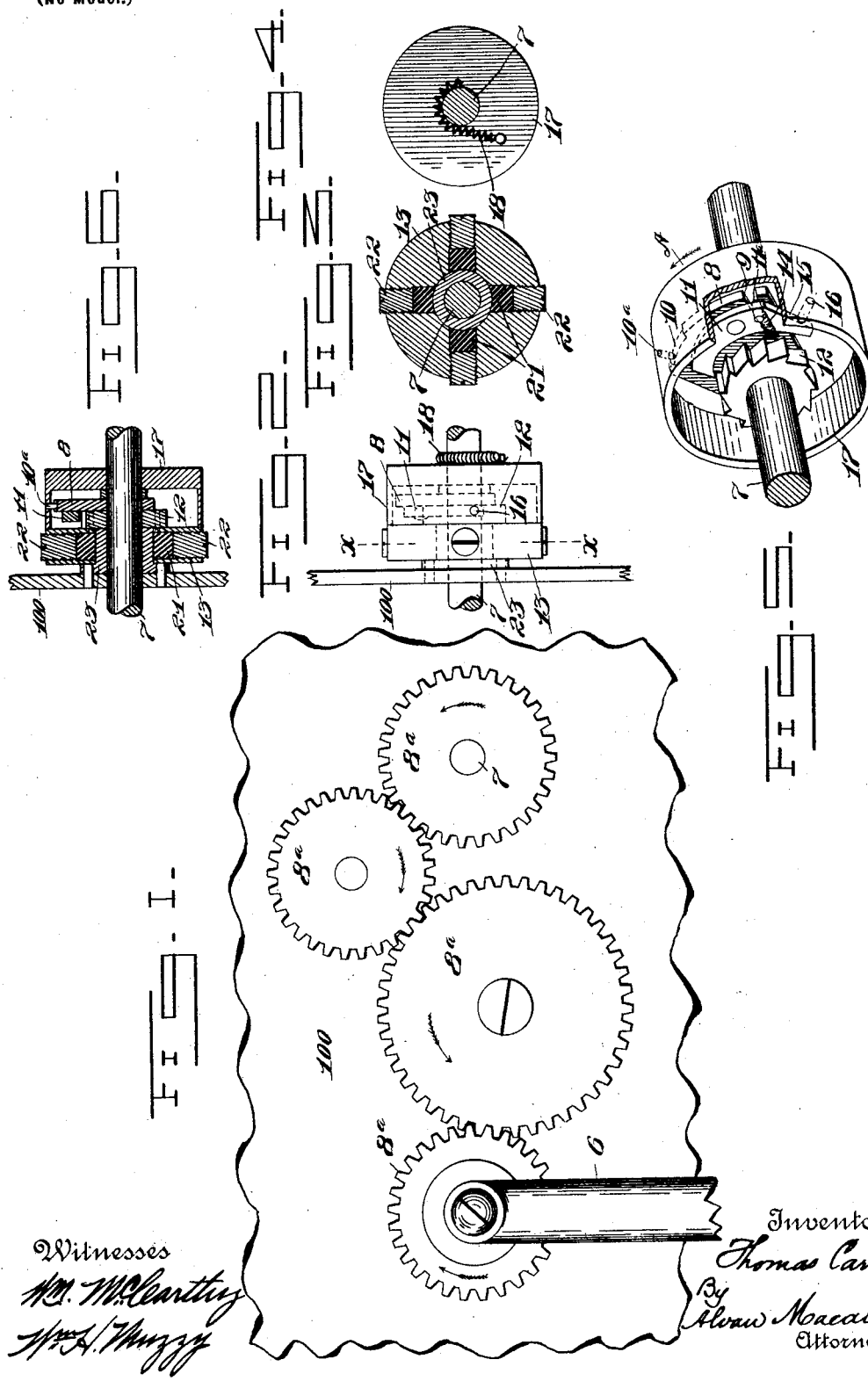
Witnesses
Inventor
Thomas Carney
By Alvan Macauley
Attorney

UNITED STATES PATENT OFFICE.

THOMAS CARNEY, OF DAYTON, OHIO, ASSIGNOR TO THE NATIONAL CASH REGISTER COMPANY, OF JERSEY CITY, NEW JERSEY, A CORPORATION OF NEW JERSEY.

BRAKE MECHANISM.

SPECIFICATION forming part of Letters Patent No. 688,386, dated December 10, 1901.

Application filed March 31, 1900. Serial No. 10,923. (No model.)

*To all whom it may concern:*

Be it known that I, THOMAS CARNEY, a citizen of the United States, residing at Dayton, in the county of Montgomery and State of Ohio, have invented certain new and useful Improvements in Brake Mechanisms, of which I declare the following to be a full, clear, and exact description.

My invention relates to improvements in speed-governors for rotary shafts. Practically I have applied it to cash-registers to prevent a too rapid or sudden movement of the operating-crank; but it is adapted to any other class of machine in which it is desired to guard against a sudden start or jerk upon the rotation-shaft.

In the appended drawings, forming part of this specification, Figure 1 represents a detail side elevation showing part of one side of a cash-register with my invention applied thereto. Fig. 2 represents a rear elevation of my attachment applied to the rotation-shaft of the machine. Fig. 3 represents a vertical transverse section through my improvement on the line $x\ x$ of Fig. 2. Fig. 4 represents an end elevation of the weighted cap and its spring. Fig. 5 represents an enlarged detail perspective view, partly broken away, of the clutch devices separated from the friction device; and Fig. 6 shows a vertical section of my invention.

In practical use I have applied my present invention to machines of the type patented to Cleal and Reinhard, No. 580,378, dated August 13, 1897, and for the purpose of illustration one of the figures of the drawings shows a detached view of the operating-gearing of such a machine as that shown and described in said patent; but it will be understood that the application of the invention is not limited to any type or even class of machines.

In general terms, my invention may be said to be a governor, which is located upon any one of the rotation-shafts of the machine. When the crank or other operating means is turned at a reasonable and moderate speed, the governor simply turns with the shaft upon which it is located, and its presence is not felt in any way. If, however, the shaft be given a sudden excessive speed of rotation—such, for example, as might endanger the mechanical integrity of the parts of the cash-register or other machine to which it is applied—the governor automatically becomes operative to check or retard the movement of the parts until the pressure upon the rotation-shaft ceases, when the governor automatically ceases to act and again simply turns with its shaft without affecting the operation of the machine, as hereinafter described in detail.

In the drawings the numeral 6 represents the operating crank-handle, 7 a rotation-shaft, and $8^a$ intermediate gears between the crank-handle and the shaft for transmitting movement from the former to the latter. Secured rigidly upon the rotation-shaft is a segmental plate 8, Fig. 5, which is provided near one end with a slot 9 and having near its other end a peripheral cut-away portion 10. To the side of the segmental plate is secured a pivoted pawl or ratchet 11, which is adapted to engage the teeth of the ratchet-wheel 12, which is secured to and carried by a friction-disk 13, Figs. 2, 3, and 6. A coil-spring 14, located in the slot 9 of the segmental plate, presses outwardly against a pin $11^a$, which is carried by the pawl 11 and tends to force the pawl into engagement with its coöperating ratchet-wheel 12. The pawl, however, is formed with a bevel-faced end 15, which normally contacts with a pin 16, which is carried by a weighted cylindrical cap or case 17, within which all of the aforesaid parts are located, except the friction-disk 13, which is located just beside the case. The pin 16 extends inwardly from the peripheral wall of the case 17 and normally holds the spring-pressed pawl 11 out of engagement with the ratchet 12. Another pin $10^a$, extending inwardly from the peripheral wall of the case into the cut-away portion 10 of the segmental plate 8, operates to cause the case to turn with the segmental plate 8, which, as stated, is rigidly secured upon the shaft 7. At the same time, however, by the means described the case may have a limited movement independent of the segmental plate and the rotation-shaft, such movement being bounded by the end walls of the cut-away portion 10 of the segmental plate 8. A coil-spring 18, which is secured at one end to the flat side of the case 17, Fig. 4, and at the other to a pin carried by the rotation-shaft, tends normally to turn the case in the direction of the arrow A, Fig. 5, thereby holding the pin 16 against the beveled end 15 and in this manner holding the pawl 11 normally disengaged from the ratchet-wheel 12.

It will be seen by reference to Figs. 2 and 6 that a collar 23 is secured at its left-hand end to a fixed portion 100 of the machine and forms interiorly a bearing for the rotation-shaft 7, which passes therethrough. Exteriorly the collar forms a bearing for the friction-disk 13, which turns thereon and which carries secured to its right-hand side the ratchet-wheel 12, as before stated. The friction-disk is provided with four radial screw-threaded holes, in the outer ends of which are screws 22. Between the inner ends of the screws and the sleeve 23 are the friction-pieces 21, formed of rubber, leather, or other suitable material. As the friction-disk turns upon the sleeve 23 it will be readily apparent that by turning the screws 22 in one direction or the other the friction of the disk on the sleeve 23 may be increased or lessened at will.

In the practical operation of my invention I adjust the screws 22 so as to cause the friction-disk to have a considerable grip upon the collar 23. As the pawl 11 and the ratchet-wheel 12 are normally disengaged, the friction-disk does not normally turn with the rotation-shaft, although, as before stated, the case 17 does turn with the shaft. If, however, a sudden excessive force be applied to the crank 6, whereby the shaft is given a sudden start or increase of speed, the case 17, being rather weighty, will lag or move a little less quickly than the shaft, and the segmental plate 8, which is fast upon the shaft, will turn forward a little ahead of the case. Consequently the pawl 11 will move ahead of the pin 16, and when this happens the incline 15, as will be readily understood, permits the spring 14 to raise the beveled end of the pawl, and thereby throw its operating end into engagement with the ratchet-wheel 12. Since the ratchet-wheel is secured to the friction-disk 13, the latter is thereby turned; but the disk exerts so much friction upon the collar 23 as to very considerably retard the movement of the parts. When the movement is thus retarded, the spring 18 tends to draw the case 17 and its pin 16 up to normal position relatively to the pawl 11 and force said pawl 11 from engagement with the ratchet-wheel 12; but this action cannot take place until the pressure upon the shaft has ceased. As long as the pressure is continued on the shaft the friction between the ratchet-wheel and pawl will prevent the return of the latter to normal position.

My invention is especially useful on cash-registers, because operators of these machines in an effort to disarrange the adding mechanism frequently give the crank-handle a series of jerks, which has a tendency to rack and injure the registering mechanism.

In this specific embodiment of my invention I have shown the case 17 as cylindrical and inclosing most of the operating parts; but of course this form is not essential to my invention, and the only essentials of the so-called "case" is that it be weighty enough to cause it to lag in starting and that it be flexibly connected to the rotation-shaft—that is, that it move generally with said shaft, but that it have a limited movement independent thereof. By means of my invention all jerking of the rotation-shaft is automatically prevented without throwing any unnecessary friction on the machine during its normal and proper operation.

Having thus described my invention, what I claim as new, and desire to secure by Letters Patent, is—

1. In a machine of the class described the combination with a fixed frame and an operating mechanism, of two normally inactive friction members connected to the frame and operating mechanism respectively and arranged to be automatically brought into action whenever an abnormal speed is suddenly attained by the operating mechanism.

2. In a cash-register, the combination with a fixed frame and an operating mechanism, of a normally inoperative friction device, a weighted case flexibly connected to the operating mechanism, and means controlled by the weighted case to automatically bring the friction device into action whenever an abnormal speed is suddenly attained by the operating mechanism.

3. In a cash-register, the combination with a frame and an operating mechanism, of a normally inactive retarding device, means for bringing the retarding device into connection with the operating mechanism, and mechanism for actuating said means when an abnormal speed is suddenly attained.

4. In a cash-register, the combination with a frame and an operating mechanism, of an automatic speed-regulator comprising two members one of which is fast to the frame and the other normally inactive, and means flexibly connected to the operating mechanism, and arranged to throw the aforesaid members into operative engagement.

5. In a cash-register, the combination with a frame and an operating mechanism including a rotation-shaft, of an automatic speed-regulator comprising two members one on said shaft and the other on said frame.

6. A speed-governor comprising a shaft connected to the movable parts of a machine, a friction-disk, a ratchet-wheel carried by said disk, an arm fast to said shaft and carrying a pawl arranged to engage said ratchet-wheel, a weighted case journaled on said shaft and arranged to operate the pawl, and a flexible connection between said case and shaft.

7. A speed-governor comprising a shaft connected to the movable parts of a machine, a friction-disk, a ratchet-wheel carried by said disk, an arm fast to said shaft and carrying a spring-pressed pawl arranged to engage said ratchet-wheel, a weighted case journaled on said shaft and carrying a pin arranged to engage the pawl to disengage it from the ratchet, and a spring connecting the case and shaft for normally holding said pin in engagement with the pawl.

8. A speed-governor comprising a friction-disk, a ratchet-wheel carried by said disk, an arm mounted on a shaft and carrying a pawl arranged to engage said ratchet, and a weighted case flexibly connected to the shaft and arranged to operate said pawl.

9. In a cash-register, the combination with an operating mechanism, of a rotary shaft, a speed-governor comprising a stationary member, a disk and adjustable friction-packings carried by said disk and means for automatically connecting said disk with the movable parts of the machine when an abnormal speed is suddenly attained.

10. In a cash-register, the combination with an operating mechanism, of a rotary shaft, a speed-governor comprising a stationary member, a disk having friction-packings and screws for adjusting said packings, and a weighted case for automatically coupling said disk with the movable parts of the machine when an abnormal speed is suddenly attained.

11. In a cash-register, the combination with an operating mechanism, of a friction-disk and a weighted member flexibly connected to the operating mechanism and arranged to bring the friction device into connection with the operating mechanism when an abnormal speed is suddenly attained.

12. In a cash-register of the class described, the combination with a rotary shaft, of a friction-disk, a case arranged to turn with said shaft but having a limited movement independent thereof, a spring connecting the case and shaft and a clutch device arranged to establish an operative engagement between the friction-disk and the case when excessive speed is suddenly attained by the rotation-shaft.

13. A speed-governor comprising a rotation-shaft, a pivoted pawl carried thereby, a friction disk or member having a frictional engagement with a fixed part of the machine and carrying a ratchet-wheel which is arranged to be engaged by said pawl, and means for holding the pawl out of engagement with said ratchet-wheel during a normal speed of rotation of the shaft and for causing or permitting said pawl to engage the ratchet-wheel whenever an abnormal speed is suddenly attained.

14. A speed-governor or retarding device for rotation-shafts comprising the case normally movably with the rotation-shaft but having a limited movement independent thereof, a friction member having a frictional engagement with a fixed part, and means for automatically establishing an engagement between the case and the friction member when the speed of rotation becomes suddenly abnormal.

In testimony whereof I affix my signature in the presence of two witnesses.

THOMAS CARNEY.

Witnesses:
 IRA BERKSTRESSER,
 WM. MCCARTHY.